Patented Sept. 29, 1953

2,653,930

UNITED STATES PATENT OFFICE

2,653,930

PROCESS FOR FREEZING MUSHROOMS

Harry Robert Dadley, Toughkenamon, Pa., assignor of one-half to Joseph V. Fidance, Kennett Square, Pa.

No Drawing. Application April 26, 1951,
Serial No. 223,173

6 Claims. (Cl. 99—193)

This invention relates to a process for preserving mushrooms, the process having to do with the preservation of the mushroom as a frozen food.

Many vegetables and fruits are now preserved indefinitely in a frozen state, but heretofore mushrooms have resisted all efforts directed along these lines, and following conventional food freezing methods, it has not been possible to preserve the mushrooms in such a way as to cause them to be attractive and wholesome when they are unfrozen and readied for use.

The broad object of the present invention is to eliminate the difficulties which have heretofore persisted, so as to enable the freezing of mushrooms to be commercially practicable.

Another important object is to preserve mushrooms as a frozen food, by a process which will be inexpensive, and readily carried out.

In carrying out my process, the mushrooms, as soon after being picked as possible, are first washed while still in an uncooked state, in a wash of warm water in which any clear food gelatin has been dissolved. I have found, for example, that a good ratio of gelatin to water, in preparing the wash, is 2 or 3 ounces of the gelatin to each half pint of water.

When the mushrooms are thoroughly clean, they are dried immediately by being rolled in flour.

Meantime, a mixture of egg, milk, and gelatin is separately prepared, and the egg or milk, or both, can be either fresh or dehydrated as desired. I have found that excellent results are obtained by dissolving 8 ounces of egg powder in one gallon of skimmed milk, and combining with this egg and milk mixture approximately 3 ounces of gelatin which will have been previously dissolved in a minimum amount of water.

The mushrooms, after having been rolled in flour, are dipped in the egg, milk, and gelatin mixture and then are rolled in bread crumbs. They are thereafter fried in deep fat at approximately 325° for perhaps 2 minutes. They are then cooled to approximately 200° and are immediately packaged and quick frozen.

I have found that when so prepared, the mushrooms will be preserved indefinitely and when unfrozen, need only be additionally fried or cooked as desired to provide an attractive, wholesome, and tasty food.

In this connection, I have found that mushrooms, when washed in a gelatin mixture as described above, will become coated with an exceedingly thin, invisible covering that seals the mushroom off completely from air, so as to make the mushroom impervious to air or ordinary moisture. At two steps in the process, as may be noted, the mushroom is coated with the gelatinous solution, first when the mushrooms are washed, and second when the mushrooms are dipped in an egg and milk mixture. This gelatinous covering is not lost during the frying of the mushrooms in deep fat, and when subsequently the mushrooms are quick frozen, the gelatinous coating makes the mushrooms completely impervious to the passage of air or moisture, whereby to preserve the mushroom indefinitely in the state in which it was at the time it was originally frozen.

It will be understood that the process may also be applied with good results in the preservation, as a frozen food, of raw or uncooked mushrooms. In this instance, the mushrooms, after being washed, are dipped in a solution of water in which gelatin has been dissolved, after which the mushrooms are quick frozen while still in a raw or uncooked state.

Thus, it will be seen that the basic characteristic of the process is the coating of the mushrooms with a thin, invisible, protective envelope of gelatin, prior to quick freezing. It is this application that has enabled merchandisers to distribute mushrooms as a frozen food, where heretofore this has not been possible.

What is claimed is:

1. The process of preserving mushrooms comprising enveloping each mushroom in an adhesive substantially air and moisture impervious coating and quick freezing the coated mushrooms.

2. The process of preserving mushrooms comprising enveloping each mushroom in a coating of gelatine and quick freezing the coated mushrooms.

3. The process of preserving mushrooms comprising enveloping each mushroom in an adhesive substantially air and moisture impervious coating, partially cooking the coated mushrooms and freezing the partially cooked mushrooms.

4. The process of preserving mushrooms comprising enveloping each mushroom in a coating comprising a mixture of egg, milk, and gelatin, partially cooking the coated mushrooms and freezing the partially cooked mushrooms.

5. The process of preserving mushrooms comprising immersing each mushroom in water containing dissolved gelatin, dipping the mushrooms which have been so immersed in a solution comprising a mixture of egg, milk, and gelatin, partially cooking the mushrooms that have been so dipped and freezing the partially cooked mushrooms.

6. The process of preserving mushrooms comprising washing each mushroom in a warm solution of water containing dissolved gelatin, drying the washed mushrooms, immersing the washed and dried mushrooms in a solution comprising a mixture of egg, milk, and gelatin; while the mushrooms are still moist from such immersion applying to said mushrooms, a crumb-type coating, cooking the coated mushrooms, and freezing the cooked mushrooms.

HARRY ROBERT DADLEY.

References Cited in the file of this patent

UNITED STATES PATENTS

| Number | Name | Date |
|---|---|---|
| 2,419,877 | Birdseye | Apr. 29, 1947 |

OTHER REFERENCES

Tressler et al.—The Freezing Preservation of Foods, Avi Pub. Co., N. Y. C. (1947), pages 335–6.